March 9, 1943. H. HAUSER 2,313,639
OPTICAL TESTING AND MEASURING APPARATUS
Filed Feb. 12, 1941 4 Sheets-Sheet 3
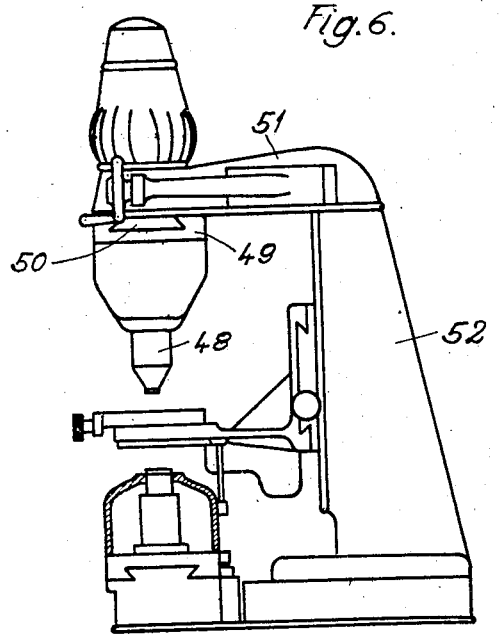
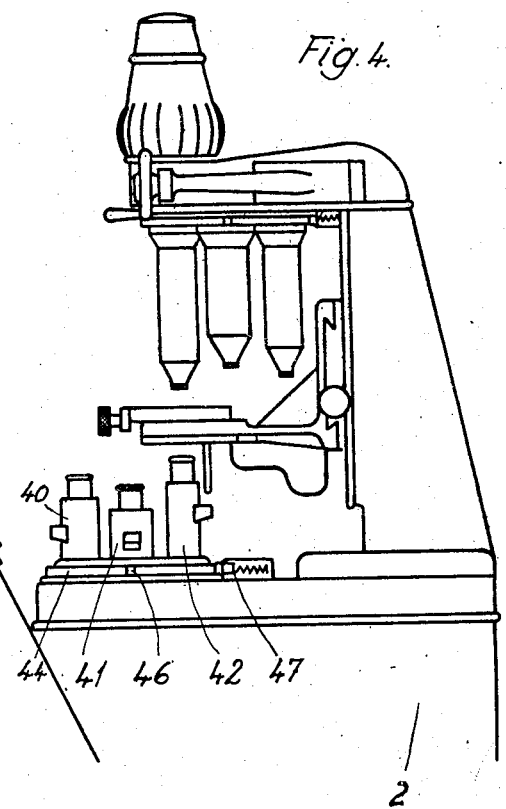
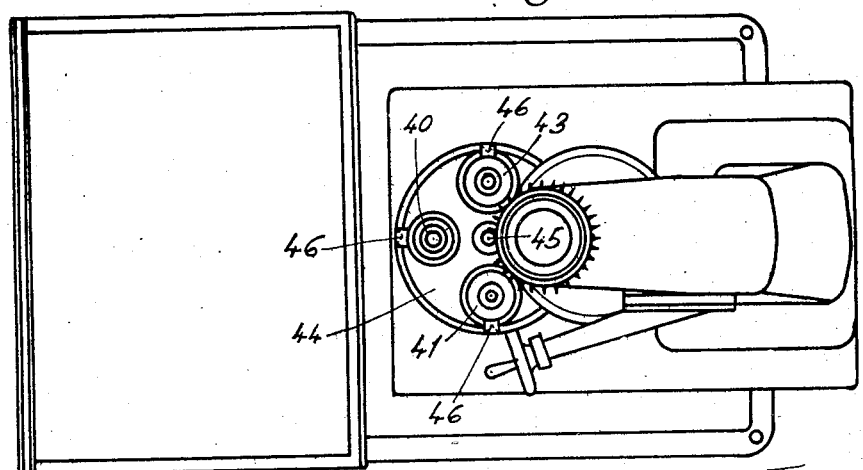

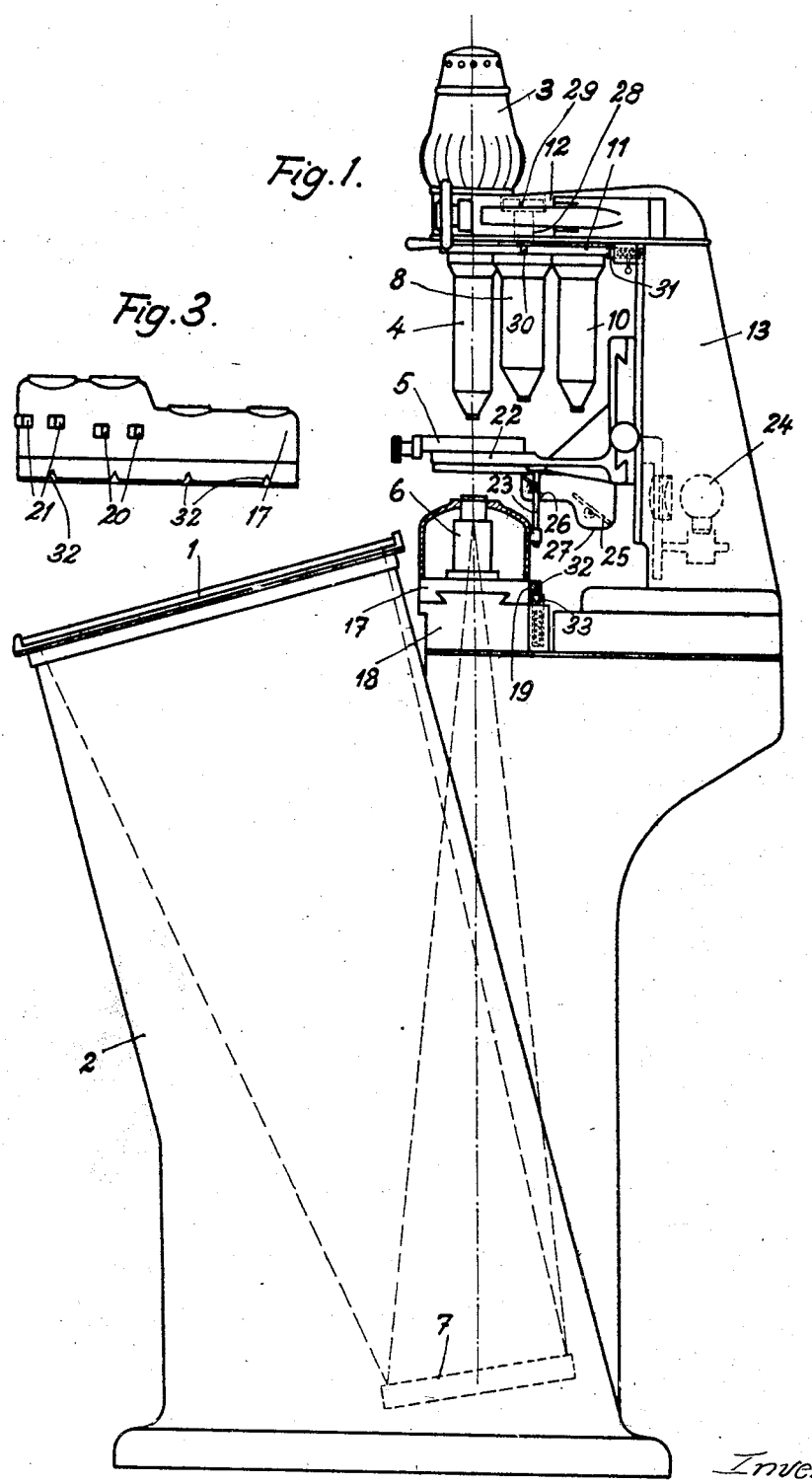

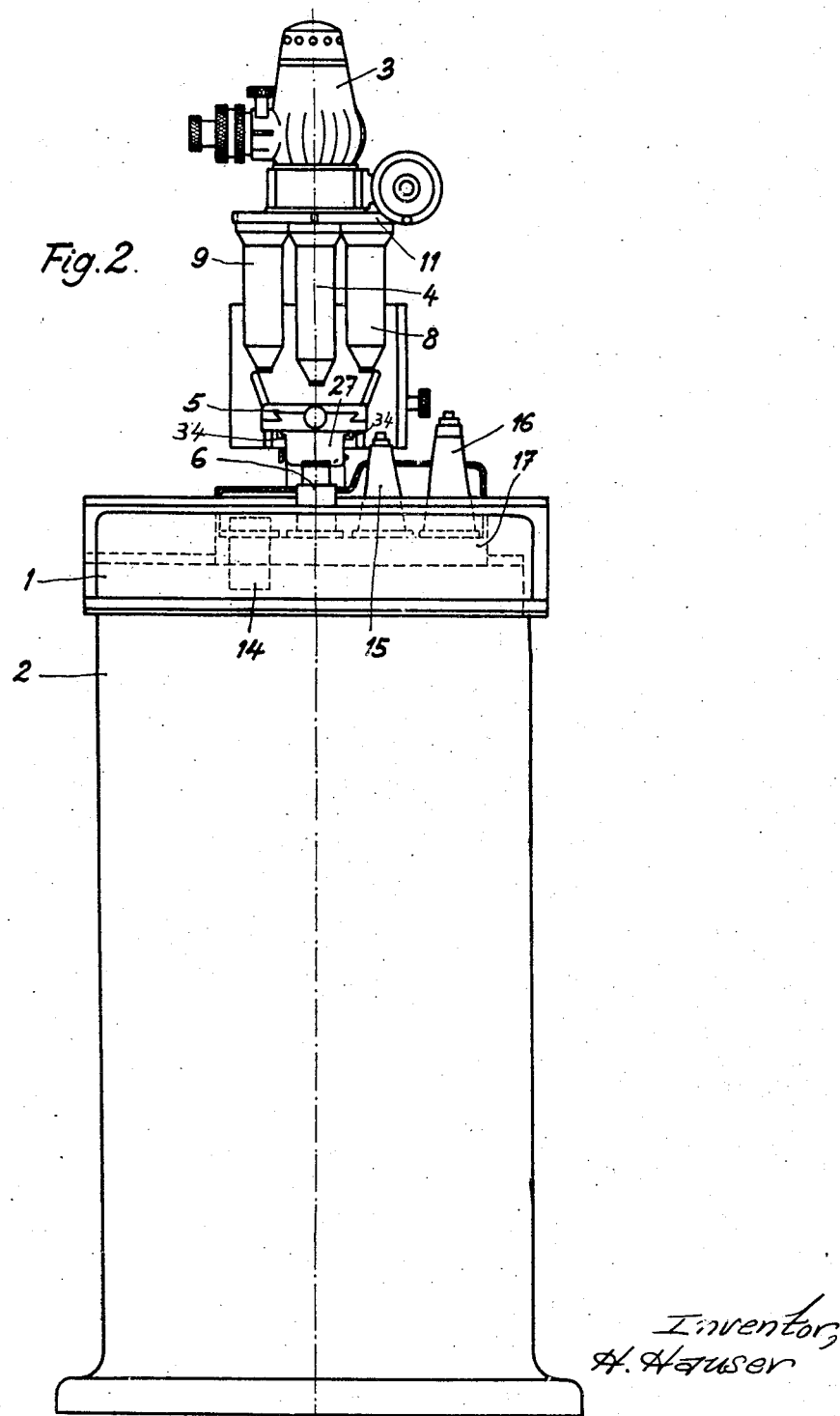

March 9, 1943.  H. HAUSER  2,313,639
OPTICAL TESTING AND MEASURING APPARATUS
Filed Feb. 12, 1941   4 Sheets-Sheet 4
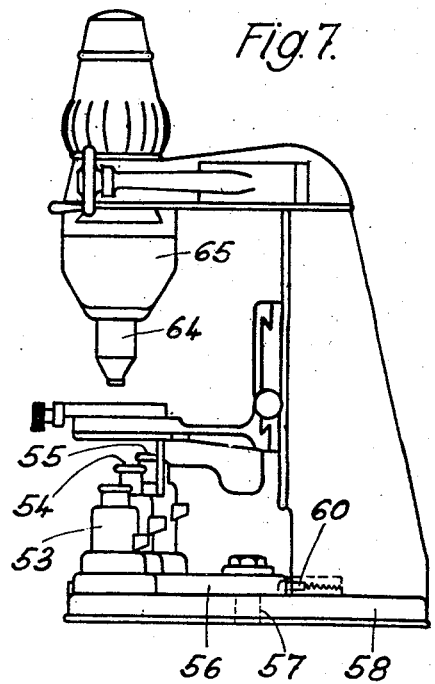
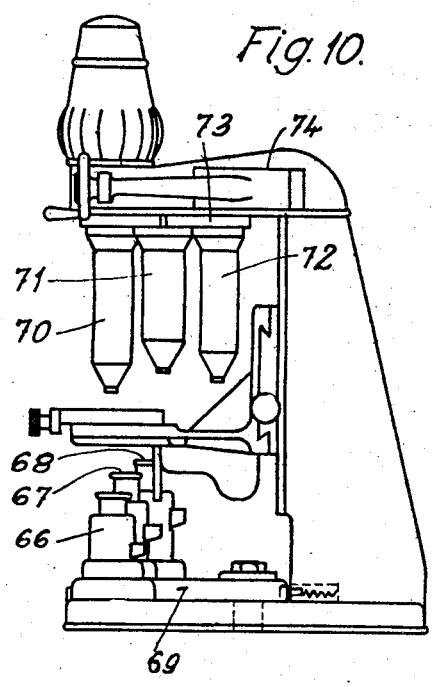
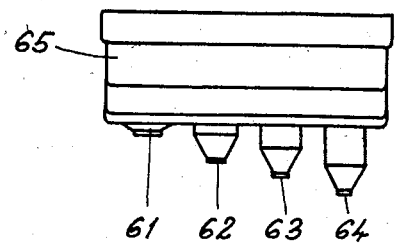
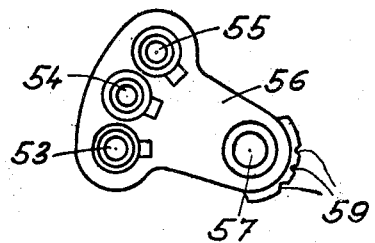
Inventor,
H. Hauser Patented Mar. 9, 1943

2,313,639

UNITED STATES PATENT OFFICE 2,313,639

OPTICAL TESTING AND MEASURING APPARATUS

Hans Hauser, Bienne, Switzerland, assignor to the firm A.-G. für Optisch-Mechanische Erfindungen, Coire, Switzerland, a joint-stock company of Switzerland Application February 12, 1941, Serial No. 378,667
In Switzerland March 7, 1940

5 Claims. (Cl. 88—24)

The present invention relates to an optical testing and measuring apparatus with several magnifying powers, specially for testing the dimensions of a work-piece and the quality of machining.

Apparatus of this kind are already known. However, in these instruments the tubes receiving the objectives and condensers are arranged stationarily. If it is desired to replace an objective by one with another magnifying power, the objective used up till now must be taken out of the tube and the new objective inserted into the same tube. The case is the same with the illuminating optical equipment, i. e., the condensers. If losses of light are to be avoided on changing the magnifying power, it is expedient to use exchangeable condensers.

The insertion and removal of the objectives into and out of the tube is very wearisome and takes up much time. Specially on testing and measuring objects of different size the devices hitherto known show many disadvantages. On the one hand, the object-stage must be removed by such a distance from the objective-tube that the objective used up till now can be taken out sideways and the new one similarly introduced. Likewise the object-stage must be removed by such a distance from the condenser-tube, that the condenser used up till now can be taken out sideways and the new one similarly introduced between the tube and the object-stage. This enlarges the height of structure of the instrument and results, as already said, in a wearisome replacing of the optical parts. Besides, this removal and insertion and the storing of the parts in special boxes requires great care and adds to the danger of their being damaged and soiled. The protecting glass lying on the bottom of the stationary objective-tube is, in many cases, difficult of access. The dust which, on the repeated replacing of the objectives, penetrates and is deposited on this protecting glass, can hardly be removed and thus makes the picture of the work piece dim.

The present invention remedies these inconveniences. It relates to an optical testing apparatus distinguished by the feature that at least some of the optical parts for the several magnifying and illuminating powers are located on movable carriers.

Another object of the invention is to provide both the condensers and the objectives of the several magnifying powers on movable carriers.

Still another object is to provide the objectives and the condensers of the several magnifying powers either on a rotatable carrier or on a slide adapted to be moved to and fro.

A further object is to provide locking means on the condenser carrier and the objective carrier cooperating with corresponding means on the frame of the apparatus, for the purpose of locking the condensers and objectives in their working position.

In a further special embodiment the objective-carrier comprises stopping means cooperating with corresponding means of the carrier of the object stage, for the purpose of preventing the objective-carrier from moving on until the object-stage has reached the level necessary for the unimpeded setting of the several objectives.

When changing the magnifying power a dismounting and mounting of the objectives and condenser is no longer necessary. These parts are put into working position by moving their carriers. This is done very quickly and without taking any special care. The optical parts can be mounted dustproof, so that no dust can settle on inaccessible places. Any desired magnifying and illuminating power may be set in a few seconds.

If the testing apparatus is provided with an epidiascope for the magnifying of opaque pieces, the mirrors, reflecting the rays emitted by the source of light of the epidiascope towards the piece to be tested, are located in a casing adapted to slide in a direction across the objective carrier, so that these mirrors can be put into and out of working position by a single manipulation.

The accompanying drawings illustrate some embodiments of the invention, but it is to be understood, that the present disclosure is by way of illustration only, and it is not to be taken as restrictive.

Fig. 1 is a side view of the testing apparatus, partly in section,

Fig. 2 is a front view of the testing apparatus, partly in section, and

Fig. 3 is a side view of the sliding objective carrier.

Fig. 4 is a side view of a second embodiment,

Fig. 5 is a top view of Fig. 4,

Fig. 6 is a side view of a third embodiment,

Fig. 7 is a side view of a fourth embodiment,

Fig. 8 is a side view of the sliding condenser carrier shown in Fig. 7,

Fig. 9 is a top view of the objective segment shown in Fig. 7 and

Fig. 10 is a side view of a fifth embodiment.

In Figs. 1, 2 and 3, 1 is the image-table mounted on the frame 2 of the apparatus. The rays of light emitted by a lamp in the lamp-carrier 3 traverse, in the first place, the condenser 4, then the piece to be tested lying on the object-stage 5, then the objective 6 and fall on the mirror 7 deviating them towards the image-table, where the magnified image of the piece to be tested appears. The optical arrangement hitherto described is well-known. The constructive arrangement of the condensers and objectives for the several magnifying powers, however, are new and may be described as follows:

All the condensers 4, 8, 9, 10 are fixed to the disc 11, which latter is pivoted on the cross-girder 12 of the column 13 of the frame by means of the pivot 28 and the bearing 29. This disc 11 has notches 30 (or other locking means), on its circumference, each of these notches belonging to a condenser and being adapted to engage and disengage a spring-controlled pawl 31 fixed to the cross-girder 12 or to the column 13.

The objectives 6, 14, 15, 16 are mounted on a slide 17 sliding on a guide 18 of the frame. This slide 17 has, e. g. on the inner longitudinal side 19, notches 32 adapted to engage and disengage a spring-controlled pawl 33 fixed to the frame, this pawl being only in so far loaded as to automatically disengage the notches by pushing or pulling the slide.

In the embodiment shown in the drawings the height of the objectives 15 and 16 is so great that they, on moving the slide 17, would knock against the object-stage 5, if the stage 5 had not previously been placed slightly higher. In order to prevent such a knocking resulting from carelessness on the part of the worker, a stopping device is provided: As may be seen from Fig. 3 stops 20, 21 are attached to the slide 17 at different levels. These stops are adapted, in a manner described later on, to cooperate with the bolt 23 fixed to the carrier 22 of the object-stage.

A further particularity of the testing apparatus according to the invention is the constructive arrangement of the mirrors of the well-known epidiascope illuminating opaque pieces to be tested. The lamp 24 of the epidiascope is located in the column 13 of the frame of the apparatus and is rigidly connected with the object-stage, so that the carrier, on moving up and down, takes the lamp 24 with it. This mounting of the lamp of the epidiascope is well-known. However, the mirrors 25, 26 reflecting the rays of light from the lamp 24 towards the under-surface of the workpiece, are mounted in a new manner, viz: They are located in a sliding case 27 adapted to slide on a guide 34 of the carrier 22 across the direction of the motion of the slide 17. The manipulation of the testing apparatus is as follows:

Be it supposed, that the apparatus is in the position shown in Fig. 2, i. e., the condenser 4 and the objective 6 lie opposite each other and that another magnifying power is now to be set, where, for instance, the objective 14 lies opposite the condenser 9. For this purpose the condenser 4 will be taken hold of and a slight pull (to the right in Fig. 2) will be exerted on it. This pull suffices to press the pawl 31 against the controlling spring and thus to throw it out of gear with the notch 30 belonging to condenser 4. At the moment when, on revolving the disc 11, condenser 9 is in working position, the spring-controlled pawl 31 engages the notch 30 belonging to the condenser 9. The objective slide 17 is now moved to the right (Fig. 2). The pawl 33 belonging to the slide 17 is pressed backwards by the notch 32 engaging it and then engages the next notch 32, belonging to the objective 14. In this way another magnifying power of the apparatus has been set.

If work with condenser 8 and objective 15 is desired, condenser 8 will now be put into working position in the manner above described. Be it supposed that the present level of the objective-stage 5 is such that the objective 15, on shifting the slide 17 to the left (Fig. 2), might touch the stage 5. This, however, is impossible, because, on displacing the slide 17 (Fig. 2), the right-hand stop 20 (Fig. 3) strikes the bolt 23 and the slide can no longer be moved. The worker's attention is thus called to the fact that it is necessary to place the object-stage 5 a little higher. By doing so, the bolt 23 is out of reach of the stop 20 and a further shifting of the slide 17 to the right (Fig. 2) can take place, until the spring-controlled pawl 33 engages the notch 32 of the objective 15. On a further shifting of the slide until objective 16 is in working position the right-hand stop 21 (Fig. 3) touches the bolt 23 and the stage 5 must again be placed slightly higher. Fig. 3 illustrates stops for the objectives 15 and 16 only, but, if required, stops could also be provided for the other objectives. In Fig. 3 two stops 20 or 21 are provided for each objective, so that, on the object-stage 5 being placed too low, the objective-slide can be moved neither to the left nor to the right; in this way any danger of one of the optical parts being damaged by knocking is entirely obviated.

If it is desired to magnify an opaque body, the sliding case 27 is pulled out (to the left in Fig. 1) until this case lies under the object, and after the epidiascope has been used the case 27 is again pushed into the position shown in Fig. 1.

The number of condensers and objectives might be other than four. The objectives might, in a similar way as the condensers, be mounted on a rotatable disc. Such an embodiment is shown in Figs. 4 and 5. The objectives 40, 41, 42, 43 are fixed to a rotatable plate 44 pivoted on the frame 2 by means of a pivot 45. Notches 46 are adapted to engage and disengage a spring-controlled pawl 47 mounted on the frame in a similar way and for the same purpose as shown in the first embodiment. The condensers are arranged as in Fig. 1.

In the embodiment shown in Fig. 6, the condensers 48 are, in a similar way as the objectives, mounted on a slide 49 sliding on a guide 50 on the cross girder 51 of the column 52. The objectives are also arranged on a slide in a like way as in Figs. 1 and 2. Slide 49 carries notches cooperating with a pawl in the same manner as in Fig. 1.

Figs. 7, 8 and 9 illustrate an embodiment in which the objectives 53, 54, 55 are placed on a segment 56 pivotally mounted by a pin 57 on the frame 58. Notches 59 are provided on the segment 56. A spring-controlled pawl 60 guided in the frame 58 is adapted to cooperate with these notches 59 in a manner similar to that described in connection with Figs. 1 and 2. The condensers 61, 62, 63, 64 are attached to a slide 65 guided in the same way as the slide 49 in Fig. 6.

Fig. 10 shows the objectives 66, 67, 68 fixed to the pivotally mounted segment 69 of the type shown in Figs. 7 and 9 and the condensers 70, 71, 72 provided on a rotatable disc 73 pivotally mounted on the cross girder 74 in the same way as illustrated in Fig. 1.

It is understood that stopping means, e. g. such as the bolt 23 and the stops 20, 21 of the first embodiment may also be provided for the objective, carriers shown in Figs. 4, 6, 7 and 10.

In the examples shown in Figs. 4 to 10 a sliding case for the epidiascope mirrors, similar to the case 27 in Figs. 1 to 3 can also be provided.

In a like manner as the objectives in Figs. 7 and 10 the condensers could also be provided on a pivotally mounted segment.

What I claim is:

1. In a contour controlling projector with several magnifying powers, a base, an upright attached to said base, a cross girder at the top of said upright, a light source carried by said cross girder, a plurality of condensers in front of said upright, a member carrying said condensers, movably mounted on said cross girder to bring any of said condensers in alignment with said light source, a plurality of objectives, a carrier carrying said objectives, movably mounted on said base and in front of said upright to bring any of said objectives in alignment with said light source, an image screen provided on said base and in front of said carrier, means for directing an image formed by any of said objectives to said screen, and an object stage mounted on said upright, going through between said condensers and said objectives and free to be moved vertically and laterally to bring an object carried by said stage in alignment with said light source and any of said objectives and into the focal plane of this latter.

2. In a contour controlling projector with several magnifying powers, a base, a bracket attached to said base, an image screen provided on said base, a light source carried by said bracket, a plurality of condensers, a member carrying said condensers, movably mounted on said bracket to bring any of said condensers in alignment with said light source, locking means on said members, a locking element on said bracket adapted to engage said locking means to lock said member in the working position of said condensers, a plurality of objectives, a carrier carrying said objectives, movably mounted on said base to bring any of said objectives in alignment with said light source, second locking means on said carrier, a second locking element on said base adapted to engage said second locking means to lock said carrier in the working position of said objectives, means for directing an image formed by any of said objectives to said screen, an object stage mounted on said bracket, going through between said condensers and said objectives and free to be moved vertically and laterally to bring an object carried by said stage in alignment with said light source and any of said objectives and into the focal plane of this latter, a stopping member on said object stage, and stopping means on said carrier, adapted to engage said stopping member to prevent said carrier from moving on until said object stage has reached the level necessary for the unimpeded setting of said objectives.

3. In a contour controlling projector with several magnifying powers, a base, an upright attached to said base, a cross girder at the top of said upright, a light source carried by said cross girder, a plurality of condensers in front of said upright, a member carrying said condensers, movably mounted on said cross girder to bring any of said condensers in alignment with said light source, a plurality of objectives of different height in structure, a carrier carrying said objectives, movably mounted on said base and in front of said upright to bring any of said objectives in alignment with said light source, an image screen provided on said base and in front of said carrier, means for directing an image formed by any of said objectives to said screen, an object stage mounted on said upright, going through between said condensers and said objectives and free to be moved vertically and laterally to bring an object carried by said stage in alignment with said light source and any of said objectives and into the focal plane of this latter, a bolt fixed to said object stage, and stops attached to said carrier at different levels corresponding to the height of structure of said objectives, adapted to engage said bolt to prevent said carrier from moving on until said object stage has reached the level necessary for the unimpeded setting of said objectives.

4. In a contour controlling projector with several magnifying powers, a base, a bracket attached to said base, an image screen provided on said base, a light source carried by said bracket, a plurality of condensers, a member carrying said condensers, movably mounted on said bracket to bring any of said condensers in alignment with said light source, a plurality of objectives, a carrier carrying said objectives, movably mounted on said base to bring any of said objectives in alignment with said light source, means for directing an image formed by any of said objectives to said screen, an object stage mounted on said bracket, going through between said condensers and said objectives and free to be moved vertically and laterally to bring an object carried by said stage in alignment with said light source and any of said objectives and into the focal plane of this latter, an episcope lamp in said bracket and integral with said object stage, a case slidable across the direction of the luminous flux emanating from said light source, a guide at the underside of said object stage, carrying said case, and episcope mirrors in said case for directing the light rays emanating from said episcope lamp to the underside of an object carried by said object stage.

5. In a contour controlling projector with several magnifying powers, a base, an upright attached to said base, a cross girder at the top of said upright, a light source carried by said cross girder, a plurality of condensers in front of said upright, a member carrying said condensers, movably mounted on said cross girder to bring any of said condensers in alignment with said light source, a plurality of objectives of different height in structure, a carrier carrying said objectives, movably mounted on said base and in front of said upright to bring any of said objectives in alignment with said light source, an image screen provided on said base and in front of said carrier, means for directing an image formed by any of said objectives to said screen, an object stage mounted on said upright, going through between said condensers and said objectives and free to be moved vertically and laterally to bring an object carried by said stage in alignment with said light source and any of said objectives and into the focal plane of this latter, a bolt fixed to said object stage, stops attached to said carrier at different levels corresponding to the height of structure of said objectives, adapted to engage said bolt to prevent said carrier from moving on until said object stage has reached the level necessary for the unimpeded setting of said objectives, an episcope lamp in said upright and integral with said object stage, a case slidable across the direction of the luminous flux emanating from said light source, a guide at the underside of said object stage, carrying said case, and episcope mirrors in said case for directing the light rays emanating from said episcope lamp to the underside of an object carried by said object stage.

HANS HAUSER.